United States Patent [19]

Hawley et al.

[11] Patent Number: 5,470,423
[45] Date of Patent: Nov. 28, 1995

[54] MICROWAVE PULTRUSION APPARATUS AND METHOD OF USE

[75] Inventors: Martin C. Hawley; Jianghua Wei; Valerie Adegbite, all of East Lansing; Min Lin, Lansing, all of Mich.

[73] Assignee: Board of Trustees operating Michigan State University, East Lansing, Mich.

[21] Appl. No.: 186,462

[22] Filed: Jan. 25, 1994

[51] Int. Cl.$^6$ ................................ B32B 31/28; B32B 5/10
[52] U.S. Cl. ........................ 156/166; 156/272.2; 156/180; 156/433; 156/181; 156/275.5; 219/698; 219/699
[58] Field of Search ..................................... 156/166, 180, 156/181, 272.2, 275.5, 433, 379.6, 380.1, 379.8, 382; 219/698, 699, 738, 736; 425/174, 174.4

[56] References Cited

U.S. PATENT DOCUMENTS

| | | | |
|---|---|---|---|
| 3,665,141 | 5/1972 | Schiffmann et al. | 219/699 |
| 3,769,127 | 10/1973 | Goldsworthy et al. | 156/172 |
| 3,793,108 | 2/1974 | Goldsworthy . | |
| 3,966,533 | 6/1976 | Goldsworthy et al. . | |
| 4,003,774 | 1/1977 | Lebet et al. | 156/180 |
| 4,151,031 | 4/1979 | Goad et al. . | |
| 4,440,593 | 4/1984 | Goldsworthy . | |
| 4,469,541 | 9/1984 | Goldsworthy . | |
| 4,477,707 | 10/1984 | Kim . | |
| 4,507,588 | 3/1985 | Asmussen . | |
| 4,585,668 | 4/1986 | Asmussen . | |
| 4,630,566 | 12/1986 | Asmussen . | |
| 4,691,662 | 9/1987 | Roppel . | |
| 4,727,293 | 2/1988 | Asmussen . | |
| 4,756,788 | 7/1988 | Bedell et al. | 156/382 |
| 4,777,336 | 10/1988 | Asmussen . | |
| 4,792,772 | 12/1988 | Asmussen . | |
| 4,906,900 | 3/1990 | Asmussen . | |
| 4,943,345 | 7/1990 | Asmussen . | |
| 5,008,506 | 4/1991 | Asmussen . | |
| 5,081,398 | 1/1992 | Asmussen . | |
| 5,114,516 | 5/1992 | Pilling et al. | 156/433 |
| 5,198,172 | 3/1993 | Spoo et al. | 156/180 |
| 5,338,497 | 8/1994 | Murray et al. | 264/25 |

FOREIGN PATENT DOCUMENTS 2397281 of 1977 France .
2245893 of 1990 United Kingdom .

OTHER PUBLICATIONS

Meyer, R. W., Handbook of Pultrusion Technology, Chapman and Hall, New York, pp. 1–7 (1985).
Wei, et al., Sampe J., 27 (1), 33, (1991).
Lee, W. I., et al., J. Comp. Mater., 18, 387 (1984).
Lee, W. I., et al., J. Comp. Mater., 18, 357.
VanKoughnett, A. L., et al., J. Microwave Power, 8 (1), 101 (1973).
Munson–McGee, S. H., Opportunities for Innovation: Polymer Composites, NIST GCR 90–577–1, p. 121 Aug., 1990.
Ghaffariyan, S. R., et al, Mat. Res. Soc. Symp. Proc., 189, 135 (1991).

*Primary Examiner*—Michael W. Ball
*Assistant Examiner*—Sam Chuan Yao
*Attorney, Agent, or Firm*—Ian C. McLeod

[57] ABSTRACT

A microwave pultrusion apparatus (10) with a frame (103, 104) with fingers (109, 110) contacting the material (200) to be processed. The frame and fingers prevent leakage of the microwaves from the cavity (12) and can be replaced or modified for various material 200 and die cross-sections. The apparatus is particularly useful for curing resin impregnated fibers.

15 Claims, 6 Drawing Sheets

MICROWAVE PULTRUSION APPARATUS AND METHOD OF USE

BACKGROUND OF THE INVENTION

1. Field of the Invention

The present invention relates to an improved pultrusion apparatus and method of use thereof for continuous processing or working of a material to provide a shaped cross-section. In particular the present invention relates to a pultrusion apparatus which is adapted to be modified for the processing of materials with different cross-sections without reconstruction of the microwave portion of the apparatus.

2. Description of Related Art

The pultrusion process is a continuous manufacturing method used to produce fiber reinforced plastic profiles with a constant cross-sectional area through the length of the product. In pultrusion, the product's shape is determined by continuously pulling the composite material through a die. Pultruded composites consist of reinforcing materials, a resin that binds the fibers together, and often a mat material to improve the appearance of the composite's surface and other ancillary materials (R. W. Meyer, Handbook of Pultrusion Technology, Chapman and Hall, New York, pp. 1 to 7 (1985)). The key step in a pultrusion process is to control the interactions among fiber, resin and additives. The conventional processing method is to heat the materials in the die through thermal convection or conduction. Either of the thermal heating methods conveys heat through the surface of the material. These heating methods often cause uneven heating in large parts.

Compared to the thermal heating method, microwave curing of composite materials is a faster and more direct heating method that takes advantage of the dielectric properties of the material being processed. The general advantages of using microwave technology include: shorter processing time, better control of temperature profiles within the composite material, and improved mechanical properties of the final part (J. Wei, et al., SAMPE J., 27 (1), 33, (1991)). Microwave heating devices such as commercial microwave ovens (W. I. Lee and G. S. Springer, J. Comp. Mater., 18, 387 (1984)) and waveguides (W. I. Lee and G. S. Springer, J. Comp. Mater., 18, 357 (1984)) have also been studied. A continuous microwave processing technique is highly desired for fast processing of large composite parts, such as long pipes or panels. The microwave leakage during continuous processing of non-conductive materials has been controlled by attaching extended entry and exit ports to the microwave cavity (A. L. VanKoughnett and J. G. Dunn, J. Microwave Power, 8 (1), 101 (1973)).

The applications of continuous microwave technique in industries has been under investigation for decades. Most of these applications are using microwave energy to preheat or to postcure materials after parts being made (S. H. Munson-McGee, Opportunities for Innovation: Polymer Composites, NIST GCR 90-577-1, pp. 121 (August, 1990)). One pultrusion application of processing materials continuously in a waveguide has been patented (UK Pat. 2,245,893, A. Cooper and J. M. Methven (1990)). The idea of using a waveguide as part of a pultrusion die is excellent in terms of the simplicity of the system. However, the dimension of the waveguide has to accord with the dielectric properties of the materials being processed in order to create the suitable microwave field patterns (S. R. Ghaffariyan and J. M. Methven, Mat. Res. Soc. Symp. Proc., 189, 135 (1991)). This requirement has greatly limited the wide application of the technique in industry due to the large variety of materials being processed.

U.S. Pat. No. 4,792,772 to Asmussen describes a general purpose microwave applicator which is commercially available. The unique feature of this apparatus is that it allows for precise tuning for mode selection and fine tuning within a mode selected. Other related prior art patents are U.S. Pat. Nos. 4,440,593, 4,507,588, 4,585,668, 4,777,336, 4,727,293, 4,630,566, 4,691,662, 4,943,345, 4,906,900, 5,081,398, and 5,008,506. This apparatus is preferred for the present invention.

The problem which was not solved in using this apparatus is how to seal the cavity when the material is being continuously processed through the microwave cavity.

U.S. Pat. Nos. 3,793,108 to Goldsworthy, 3,966,533 to Goldsworthy et al, 4,151,031 to Goad et al, 4,469,541 to Goldsworthy, 4,477,707 to Kim, British Patent Application No. 2,245,893 to Cooper et al and French Patent Application No. 2,397,281 assigned to SAEI Celite describe various methods for pultrusion using microwave energy curing. In all of these devices the microwaves are assumed to be generated without means for adjusting either the mode or fine tuning the mode of the microwaves.

The problem not solved by the prior art is how to provide a microwave apparatus which is adaptable to many different applications of continuous pultrusion without building a special purpose apparatus for each application and which is safe such that the microwaves are sealed in the cavity.

OBJECTS

It is therefore an object of the present invention to provide a microwave pultrusion apparatus which is adaptable to many different applications. It is further an object of the present invention to provide a microwave pultrusion apparatus which prevents leakage of microwaves from the cavity. It is further an object of the present invention to provide an apparatus which is relatively inexpensive to construct. These and other objects will become increasingly apparent by reference to the following description and the drawings.

DESCRIPTION OF PREFERRED EMBODIMENTS

Figure 1:
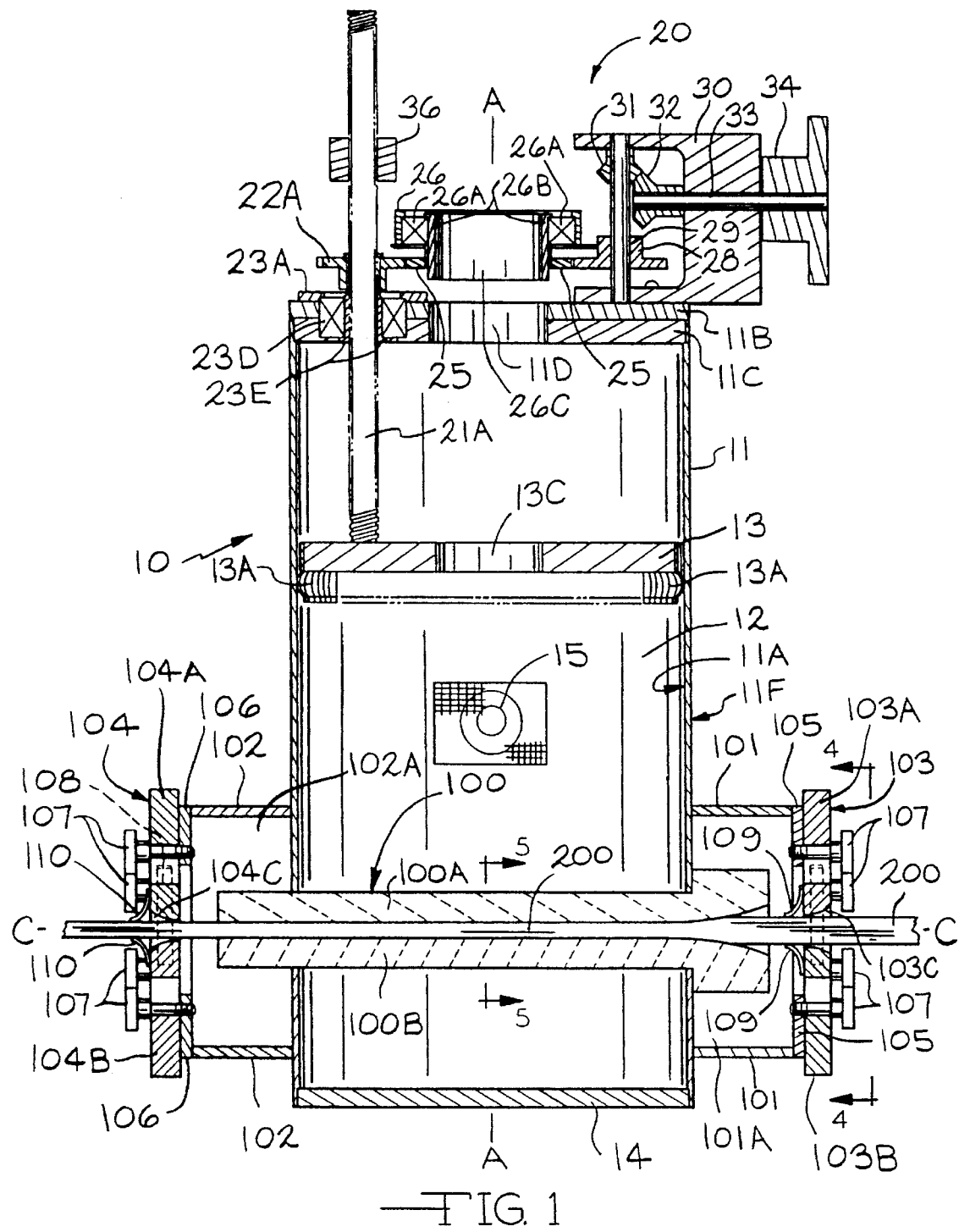
FIG. 1 is a front cross-sectional view of the apparatus 10 of the present invention, particularly illustrating a replaceable pultrusion die 100 and adjustable, and replaceable frames 103 and 104 with windows 103C, 104C, 103B, and 104B, and fingers 109 and 110 around material 200 for confining the microwaves in the cavities 101A and 102A.

The present invention relates to an improved electromagnetic wave generating apparatus including a metallic electromagnetic wave cavity defined by at least one wall which cavity is excited in one or more of its modes of resonance in the cavity around a central axis of the cavity including moveable plate means in the cavity mounted perpendicular to the central axis in the cavity and moveable along the central axis, moveable probe means connected to and extending inside the cavity for coupling the electromagnetic wave to the cavity and control means for moving the probe means and plate means in order to select and control the mode of the electromagnetic wave in the cavity which comprises: a lossless pultrusion die with an opening along a longitudinal axis of the die and with a defined cross-section for a material to be treated with the microwaves mounted through the cavity with opposed ends which extend through opposed portions of the wall of the cavity; metallic extension having a proximal end mounted on each of the opposed portions of the wall of the cavity so as to surround the material to be treated and extend away from the wall and having openings at a distal end of each of the housings; frame means mounted over each of the openings at the distal ends of the extensions, each having a window aligned along and with the longitudinal axis of the die; and metallic finger means mounted around the windows of the frame means so as to surround the material to be treated on an outside surface of the cross-section of the material to be processed.

Further, the present invention relates to a method for pultrusion of a continuous material which comprises providing a electromagnetic wave generating apparatus including a metallic electromagnetic wave cavity defined by at least one wall which cavity is excited in one or more of its modes of resonance in the cavity around a central axis of the cavity including moveable plate means in the cavity mounted perpendicular to the central axis in the cavity and moveable along the central axis, moveable probe means connected to and extending inside the cavity for coupling the electromagnetic wave to the cavity and control means for moving the probe means and plate means in order to select and control the mode of the electromagnetic wave in the cavity the improvement which comprises a lossless pultrusion die with an opening along a longitudinal axis of the die and with a defined cross-section for a material to be treated with the microwaves mounted through the cavity with opposed ends which extend through opposed portions of the wall of the cavity; metallic extensions mounted on each of the opposed portions of the wall of the cavity so as to surround the material to be treated and extend away from the wall and having openings at a distal end of each of the housings; frame means mounted over each of the openings at the distal ends of the extensions, each having a window aligned along and with the longitudinal axis of the die; and metallic finger means mounted around the windows of the frame means so as to surround the material to be treated on an outside surface of the cross-section of the material to be processed; providing the frame members so that the material is in contact with the finger means on the frame means to prevent leakage of microwaves from the cavity; feeding the material through the die so that the material is cured by the microwaves, wherein the finger means prevent the microwaves from leaking from the cavity and extensions.

Unlike a waveguide, the resonant microwave cavity can be tuned to the optimum heating patterns which are corresponding to the heating modes for different processed materials. The microwave pultrusion apparatus of method of the present invention is fundamentally different from the preheating and postcuring applications of the prior art. The microwave energy heats materials directly through the die while they are pultruded through the microwave cavity.

Figure 2:
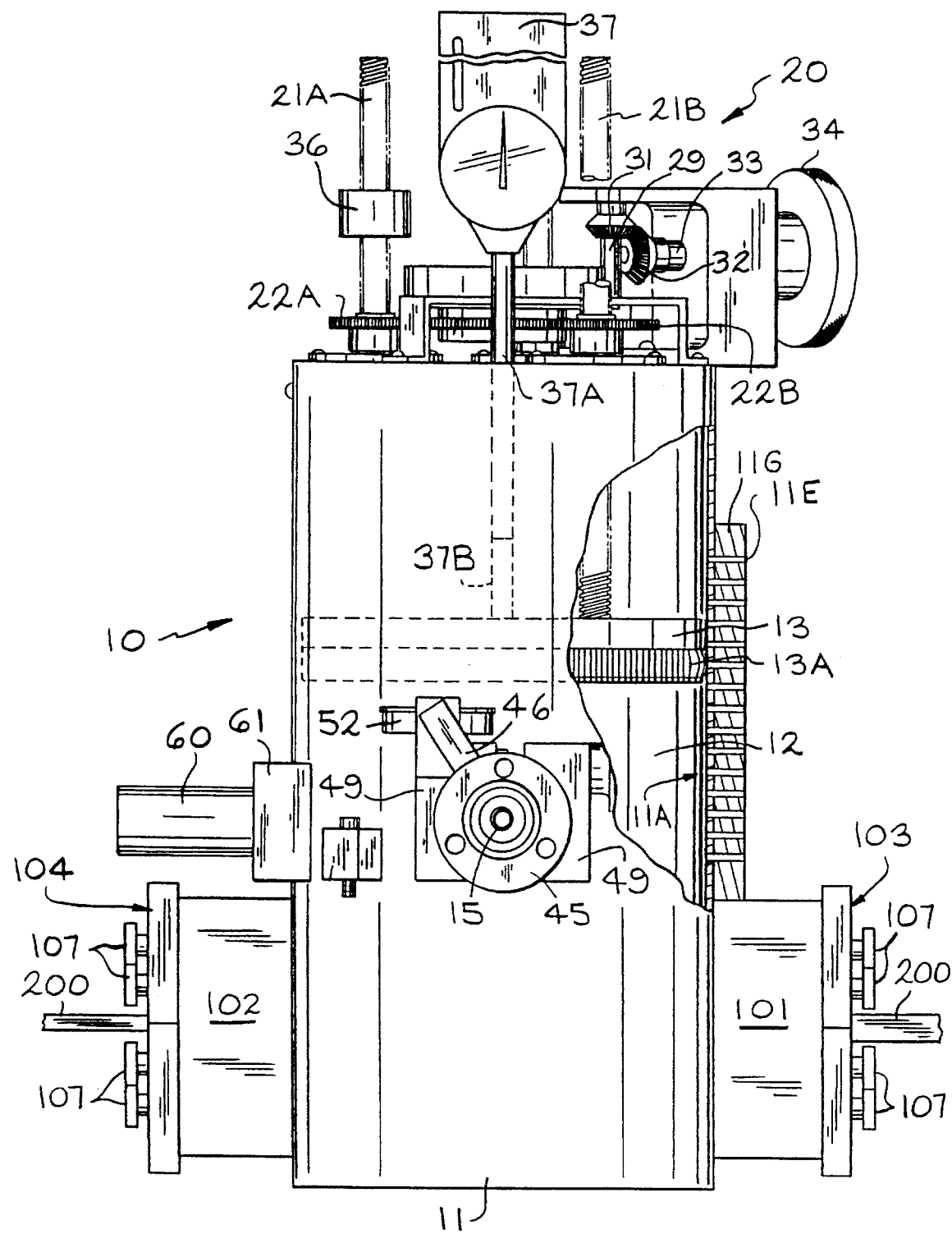
FIGS. 2 is a rear view in partial section of the apparatus 10 of FIG. 1.
Figure 3:
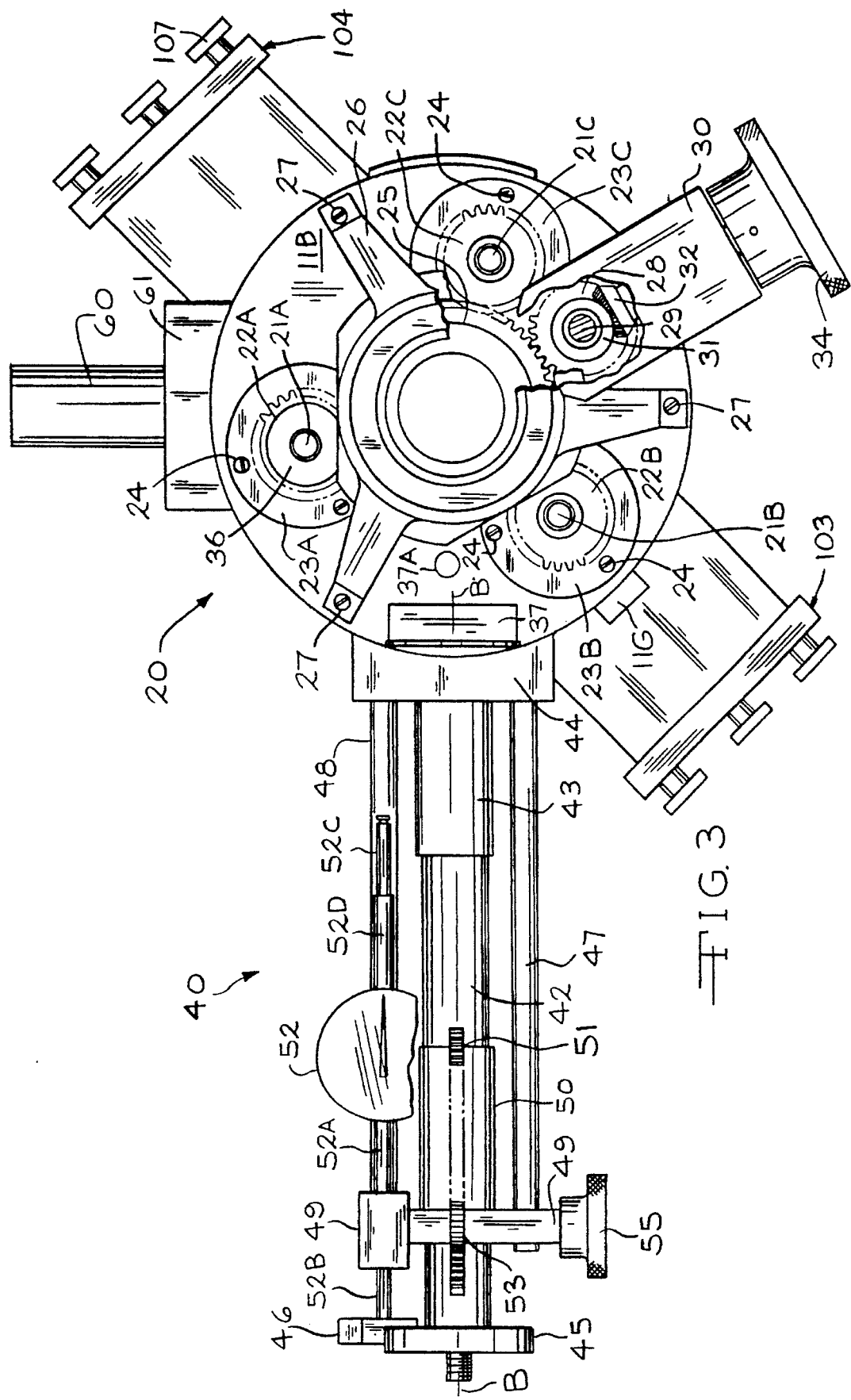
FIG. 3 is a plan view of the apparatus of FIG. 1 showing adjusting mechanisms 40 and 20 for the probe 15 and for the sliding short 13, respectively.
Figure 4:
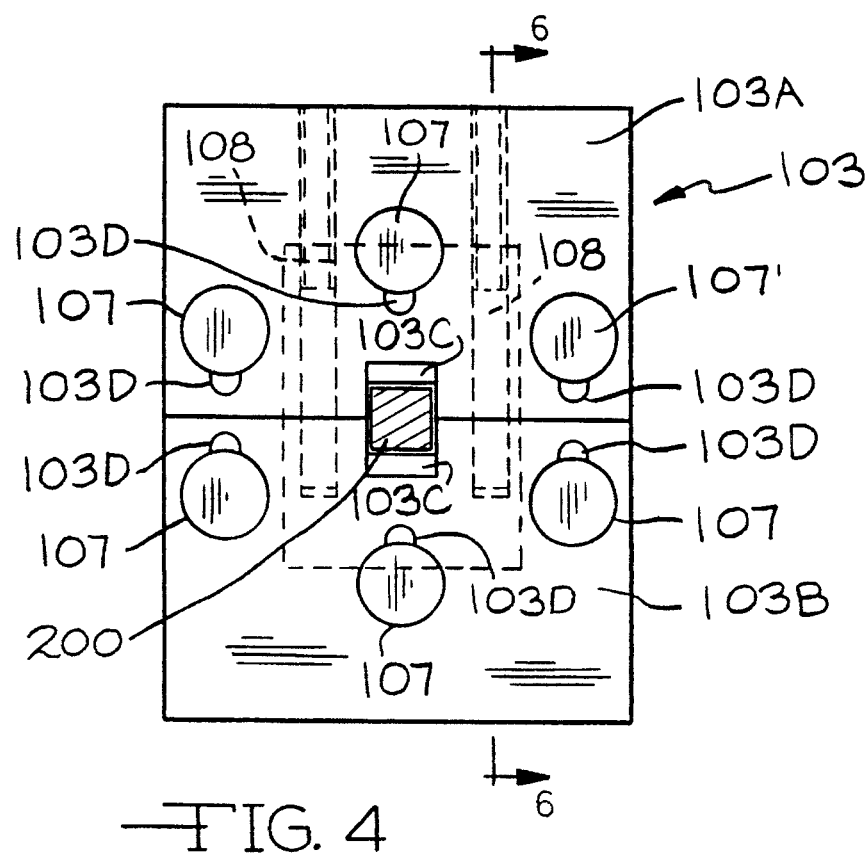
FIG. 4 is a side view of one of the adjustable frames 103 of FIG. 1 with window 103B for material 200.
Figure 5:
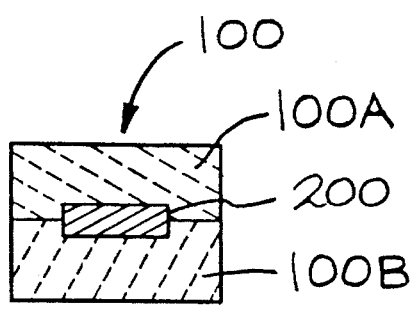
FIG. 5 is a cross-sectional view along line 5—5 of FIG. 1 showing a cross-section of the die 100 including valves 100A and 100B.
Figure 6:
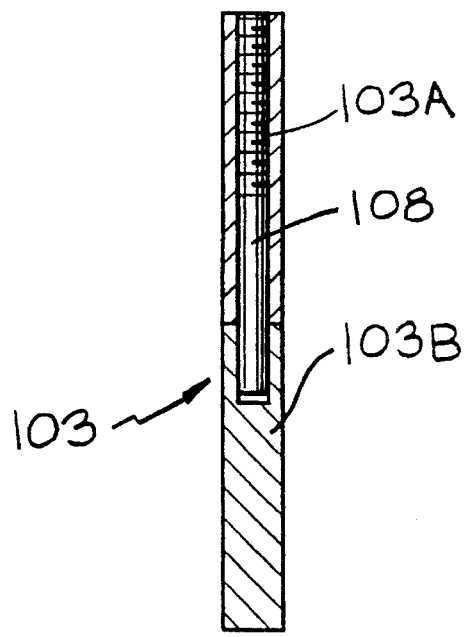
FIG. 6 is a cross-section along line 6—6 of FIG. 4 showing the pins 108 in the frame 103 for aligning the upper and lower frame members 103A and 103B. The frame 104 is identically constructed.
Figure 7:
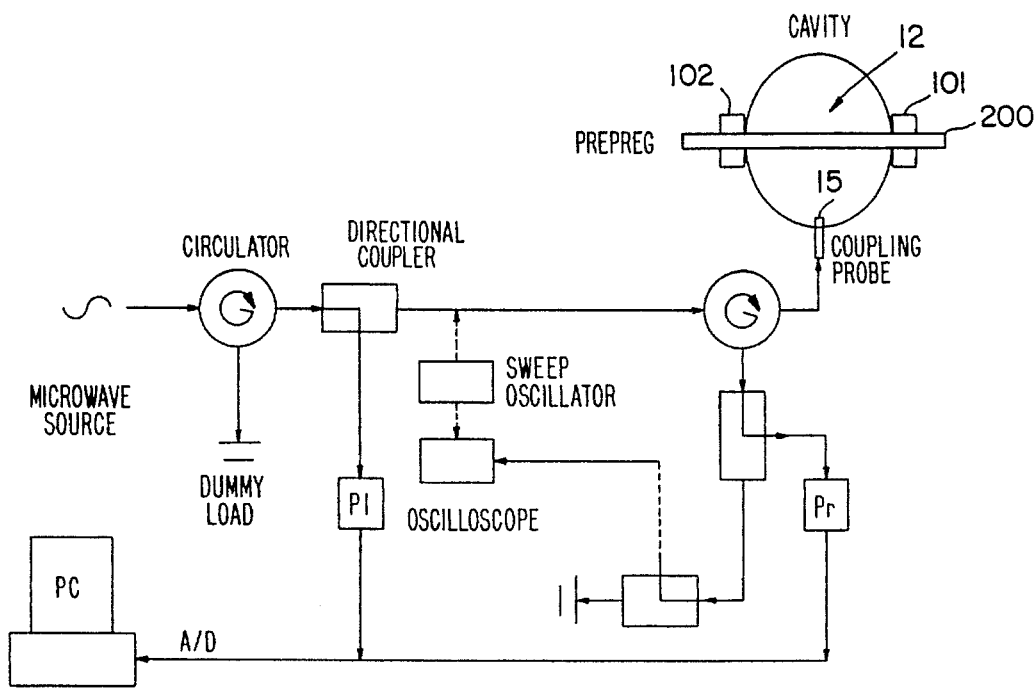
FIG. 7 is a schematic view of the probe 15 circuit used for the present invention.

FIGS. 1 to 3 show the preferred general electromagnetic wave generating apparatus 10 of the present invention as described in U.S. Pat. No. 4,792,772. A circularly cross-sectioned, electrically conductive housing 11 defines a cavity 12 around central longitudinal axis A—A for the electromagnetic wave along with a moveable plate 13 and a fixed plate 14 which are also electrically conductive. Conductive fingers (preferably metallic) 13A engage an inside wall 11A of the housing 11. A probe 15 (FIG. 1) is moveable into and out of the cavity 12 and couples the electromagnetic wave to the cavity 12. The cavity 12 is closed. The apparatus is used for electromagnetic wave processing in chamber 12. The fixed plate 14 is secured to a vacuum source (not shown).

The mechanisms 20 and 40 are provided for moving the probe 15 and moveable plate 13 in the cavity 12. The mechanism 20 includes three externally threaded posts 21A, 21B and 21C attached to the plate 13 and mounted through a top portion 11B of the housing 11. As shown in FIG. 3, planetary gears 22A, 22B and 22C are rotatably mounted on the top portion lib of the housing 11 on internal cover 11C by means of support members 23A, 23B and 23C and screws 24. The support member 23A includes a bearing 23D and spindle 23E supporting gear 22A. Support members 23B and 23C are constructed in the same manner. Central gear 25 is rotatably mounted around the central axis a—a on bracket 26 on top portion 11B by means of screws 27. Bracket 26 includes a bearing 26A and spindle 26B which mounts central gear 25 so as to engage each of the planetary gears 22A, 22B and 22C. A side gear 28 engages the central gear 25 and is mounted on a shaft 29. The shaft 29 is mounted in a C-shaped member 30. First bevel gear 31 is mounted on shaft 29 and is engaged by second bevel gear 32 mounted on shaft 33 and rotatably supported at right angles to shaft 29 on C-shaped member 30. A rotatable knob 34 is secured to shaft 33 and includes indicia (not shown) for determining increments of position of the knob 34 relative to the C-shaped member 30. Stop 36 is in threaded engagement with post 21A to prevent movement of the plate 13 beyond a particular point in the cavity 12. As can be seen from FIGS. 1 to 3, the plate 13 is moved along central axis a—a by turning knob 34 which rotates shaft 33, first and second bevel gears 31 and 32, shaft 29, side gear 28, central gear 25 and then planetary gears 22A, 22B and 22C which move posts 21A, 21B and 21C vertically and plate 13. The knob 34 can be controlled manually or it can be controlled by a motor (not shown). The central gear spindle 26B has an opening 26C along the axis a—a which can be used for inserting a quartz tube (not shown) for a confining plasma or an object to be treated with the electromagnetic waves in cavity 12, but which is not used in the present invention. The top portions 11B and internal cover 11C have a central opening 11D and the plate 13 optionally has an internal opening 13C to provide access to cavity 12. A micrometer 37 with a fixed stem 37A is secured to top portion 11B and a moveable stem 37B engages the plate 14. Openings 11E in the bar 11G are provided for sensors (not shown) to determine the electrical field strength within the cavity 12 at various positions and spacings from the axis a—a. As the plate 13 moves, the micrometer 37 measures the change in position.

The mechanism 40 controls the probe 15. The probe 15 is mounted perpendicular to the central axis A—A on axis B—B (FIG. 3) and is moveable into and out of the cavity 12 in tube 42 thereby rigidly mounting the probe 15. The probe 15 is constructed as described in U.S. Pat. No. 4,792,772. The tube 42 is mounted on the housing 11 by means of block 44 so that the tube 42 slides into and out of the receiver 43. In addition, a second receiver 60 and block 61 are mounted on the housing 11 to allow for moving the probe 15. The tube 42 includes an electrical connector 45 with a projection 46 perpendicular to the axis B—B. Posts 47 and 48 are mounted parallel to the axis B—B. A holder 49 is mounted on the posts 47 and 48 and slidably supports the tube 42. A sleeve 50 mounts a rack 51 on the tube 42. The holder 49 supports a micrometer 52 with a fixed stem 52A and a moveable stem 52B which engages the projection 46. The position of the moveable stem 52B can be adjusted by means of adjuster 52C on support 52D of the micrometer 52. Knob 55 is used to rate the gear 53 and thus move the probe 15 into and out of the cavity 12. In operation the knob 55 can be controlled manually or by a motor (not shown).

As can be seen from FIGS. 1 to 4, the control of the probe 15 and plate 13 is by means of knobs 34 and 55. The result is a very simple and precise means of making micrometer adjustments of the probe 15 and plate 13 in the cavity 12. This allows the selection of the mode of the electromagnetic wave as well as adjustments to provide fine tuning within a mode. Micrometers with a digital readout (not shown) can be used. Motors (not shown) can be used to move the plate 13 and probe 15. The result is a very useful and commercially acceptable microwave cavity.

FIG. 1 shows the pultrusion die 100 with sections 100A and 100B mounted through housing 11. A continuous length of material 200 being treated is moved through the die 100 along axis C—C. Rectangular cross-sectioned extensions 101 and 102 are mounted on the outer wall 11F. Frames 103 and 104 are mounted on open end plates 105 and 106 on extensions 101 and 102 by means of bolts 107 which extend through slots 103D (one shown) in frames 103 and 104 and thread into the plates 105 and 106. The frame 103 is divided into two portions 103A and 103B and frame 104 has portions 104A and 104B which allow adjustment of the frames 103A, 103B, 104A and 104B on pins 108. The frame 104 is constructed identically to frame 103 with portions 104A and 104B. Metallic fingers 109 and 110 are mounted on each of the frames 103A, 103B, 104A and 104B so as to surround windows 103C and 104C on frames 103 and 104.

In operation, the frames 103A and 103B and 104A and 104B are moved apart and the material is inserted through the die 100. The frames are then moved together so that the fingers 109 and 110 are in contact around a cross-section of the material 200. The material 200 is then pulled through the die 100 using conventional rollers or the like (not shown).

Figure 8:
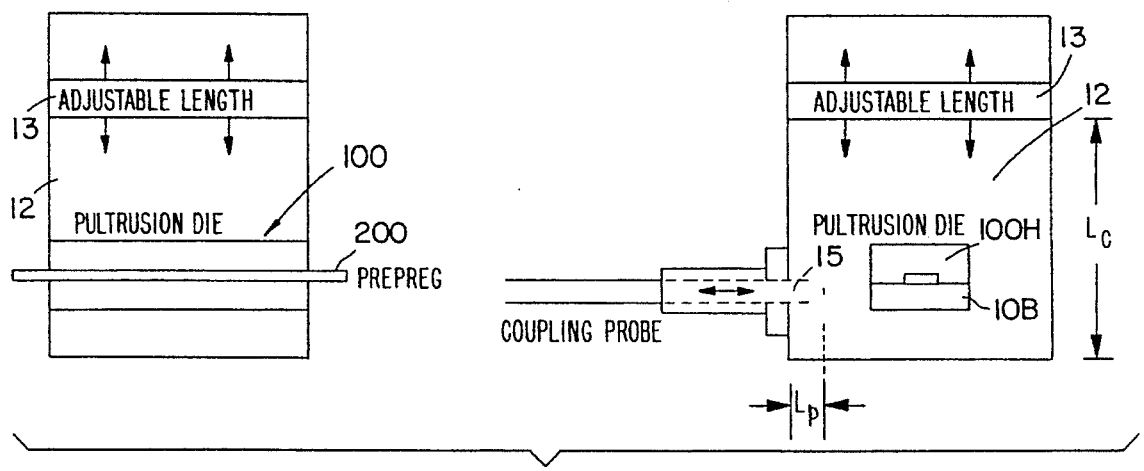
FIG. 8 is a schematic view of the cavity 12 showing Lp and Lc.

The microwave resonant modes were located using a swept frequency oscillator. A single frequency (2.45 GHz) power source was used for heating and curing tests. The input and reflected power were measured on-line during processing. As is seen in FIG. 8, the microwave cavity 12 was kept tuned by adjusting the cavity length (Lc) and coupling probe depth (Lp) so that the reflected power is minimum. A 17.78 cm inner diameter tunable cylindrical batch microwave cavity was modified for the microwave pultrusion processing. A Teflon die 100 was used for heating studies, and a ceramic die 100 was used for pultrusion tests. The surface of the ceramic die 100 was specially treated with a releasing agent, MICROCOAT E148B, ChemTrend, Inc., Howell, Mich., to prevent it from scratching by the material to be pulled through it.

The prepreg was prepared separately in a fiber/resin prepreging machine (Hot Melt Prepreg, Research Tool Corporation, Ovid, Mich.). The material 200 used was a continuous prepreg consisting of glass fiber/vinyl ester and vinyl toluene resin. The resin also contained 1 wt % of benzyl peroxide as a cross-linking agent (Aldrich Chemical Company, Inc., Milwaukee, Wis.). The prepreg 200 was tested in a Teflon die 100 at different heating modes. The microwave energy distribution on the prepreg was studied. The optimum heating mode for the prepreg 200 was found at a cavity 12 length of 155.27 mm and coupling probe-depth of 10.80 mm, at which the prepreg 200 was heated to 40° C. in 2 minutes with a small input power 30 W. A microwave transparent ceramic die 100 was designed to fit into the microwave cavity 12. The prepreg 200 was pultruded through the die 100 and heated at the same time. The curing effects were also studied for different residence times and at different positions of the prepreg. The processing speed was 0.5 cm/min. With an input power of 100 W. The prepreg 200 was fully cured both at the center and edges as it was pulled through the cavity 12 at this rate and input power. In the heating tests, the temperatures were measured using temperature probes attached to the surface of the prepreg 200. In the pultrusion tests, the prepreg 200 was pulled through the cavity 12 and die 100 using a variable speed step motor which drove rollers (not shown). The dimension of the pultruded material had approximately the same dimension of the die opening in the center, 2.45 cm× 0.294 cm. The input power for pultrusion tests was 100 W. The pulling rate of prepreg 200 was fixed at 0.5 cm/min. and the maximum microwave leakage was well under the safety limit (10 mW/cm$^2$ at 2.45 GHz (Threshold limit values and biological exposure indices for 1988–1989, American Conference of Governmental Industrial Hygienists, Cincinnati, Ohio, pp. 103 (1988)). A differential Scanning Calorimetry (DSC) was used to determine the extent of cure for the pultruded samples.

There were a total of four resonant heating modes available in the prepreg 200 loaded tunable microwave cavity with Teflon die 100. Table 1 lists the cavity length and coupling probe depth parameters for each heating mode.

TABLE 1

| Heating Modes of Microwave Cavity with Teflon Die | | |
|---|---|---|
| MODE | Lc (mm) | Lp (mm) |
| 1 | 109.85 | 12.79 |
| 2 | 130.51 | 9.74 |
| 3 | 137.08 | 22.99 |
| 4 | 154.45 | 11.54 |

Figure 9:
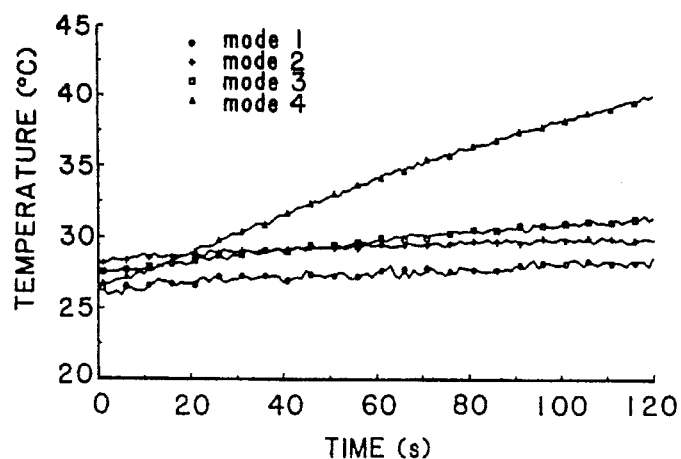
FIG. 9 is a graph showing heating tests at different microwave modes.

In order to find the optimum heating mode for the prepreg system, further tests were made by heating the prepreg 200 at each heating mode with same input power 30 W. Temperatures were taken along the centerline of the prepreg at a time interval of 5 sec. As shown in FIG. 9, Mode 4 is the heating mode with greatest heating rate for the prepreg system and die geometry. The prepreg was heated to 40° C. in approximately 2 minutes at an input power of 30 W.

Figure 10:
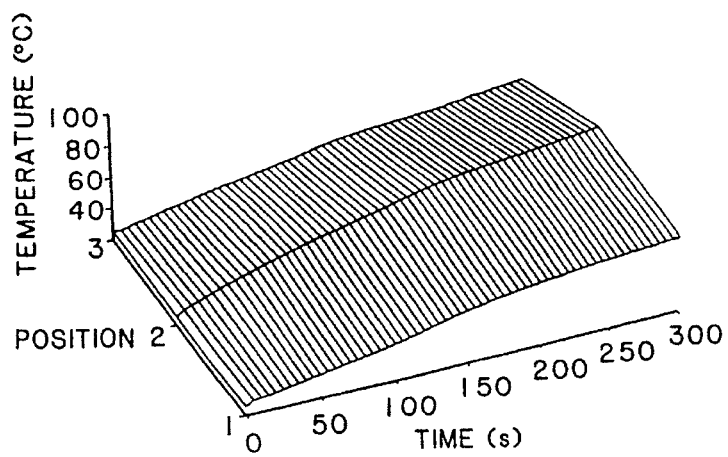
FIG. 10 is a graph showing heating tests at a particular mode.

More heating experiments were conducted to study the distribution of microwave energy dissipation into the prepreg 200 inside the cavity 12. The prepreg was tested at mode 4 and temperatures were taken along the length of the prepreg 200 on the center and the edges. FIG. 10 shows the heating results at different positions of the prepreg at 60 W input. Positions 1 and 3 refer to the edges of the prepreg, while position 2 refers to the centerline of the prepreg. The temperatures were taken along the length of the prepreg and the average of these temperatures is presented in FIG. 10. It can be seen that the prepreg 200 was heated to 80° C. (the cross-linking temperature) within 5 minutes. The temperature gradient across the prepreg is small, with less than 10° C. different between the center and edges of the prepreg.

With the ceramic die 100 inside, the microwave resonant cavity length (Lc) for each heating mode shifted several millimeters as shown in Table 2. However, the heating modes for the prepreg 200 remained unchanged.

TABLE 2

Heating Modes of Microwave Cavity with Ceramic Die

| MODE | Lc (mm) | Lp (mm) |
| --- | --- | --- |
| 1 | 97.35 | 17.25 |
| 2 | 114.92 | 24.83 |
| 3 | 120.64 | 12.75 |
| 4 | 146.76 | 12.38 |

Figure 11:
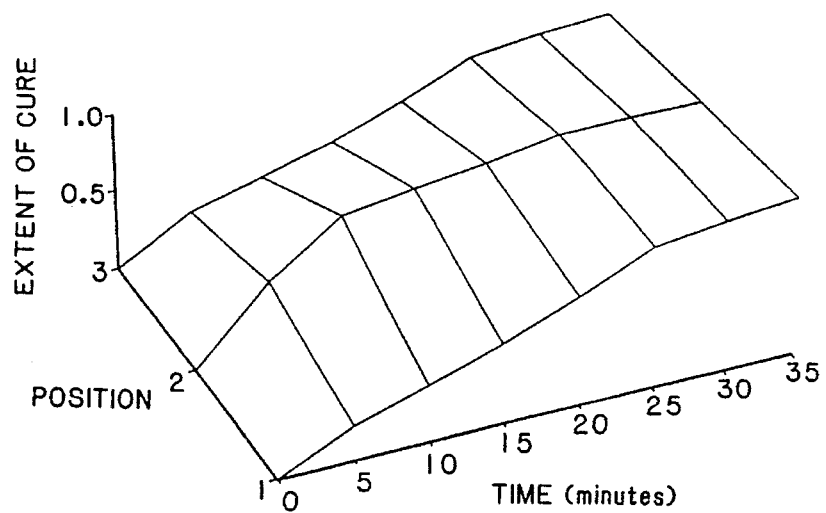
FIG. 11 is a graph showing curing tests at a single mode.

The pultrusion tests were accomplished using the best heating mode (mode 4) for the prepreg system at a processing speed of 0.5 cm/min. and 100 W input power. The ceramic die 100 was used because of its superior mechanical properties. However, the input power had to be increased due to its reduced microwave transparency as compared to that of the Teflon die 100. As is seen in FIG. 11, the extents of cure were measured for pultruded prepreg 200 samples cured at different residence times. It is found that at short residence times the extent of cure is greater at the center than at the edges. But as the residence time increases the extent of cure is consistent and complete across the width of the prepreg. To increase the microwave processing speed, the input power has to be increased. A higher microwave power source (up to 1 KW) is used for faster continuous microwave pultrusion process.

The curing rate of a composite material 200 is determined by the heating efficiency which, in turn, depends on the efficiency of microwave energy coupling into the material 200 to be processed. The coupling of microwave energy with the material 200 mainly depends on the dielectric properties of the material. Other factors include the efficiency of microwave cavity 12 and the location of the pultrusion die 100 inside the cavity. Other heating modes can heat the material as efficiently at different die locations.

It has been shown that continuous microwave pultrusion is feasible in a modified tunable microwave cavity 12 with a microwave transparent die 100 fitted inside. The absorption of the microwave energy is a strong function of the resonant heating mode. The distribution of the microwave energy is even across the width of the prepreg 200. The prepreg 200 is heated directly through the die 100 while being pultruded through the microwave cavity 12. The fast heating speed shows the capability of coupling microwave energy into the prepreg 200 through the die 100. Also, the even curing of the prepreg 200 provides the basis for producing high performing microwave pultruded composites. The modified tunable microwave cavity provides a suitable heating mode for different composite systems. The microwave transparent property of the pultrusion die 100 allows microwave energy dissipating into the prepreg 200 directly. The heating results show that microwave energy is absorbed strongly and distributed evenly in the prepreg 200 for the heating mode 4. The pultrusion tests show that the curing of the pultruded prepreg 200 with microwaves is effective. The success of the improved microwave pultrusion apparatus and method introduces new areas for pultrusion products which are limited by the current thermal heating methods.

It is intended that the foregoing description be only illustrative of the present invention and that the present invention be limited only by the hereinafter appended claims.

We claim:

1. In a microwave generating apparatus including a metallic cavity defined by at least one wall which cavity is excited in one or more of its modes of resonance in the cavity around a central axis of the cavity including moveable plate means in the cavity mounted perpendicular to the central axis in the cavity and moveable along the central axis, moveable probe means connected to and extending inside the cavity for coupling the microwave to the cavity and control means for moving the probe means and plate means in order to select and control the mode of the electromagnetic wave in the cavity the improvement which comprises:

(a) a lossless pultrusion die with an opening along a longitudinal axis of the die and with a defined cross-section for a material to be treated with the microwaves mounted through the cavity with opposed ends which extend through and are mounted on opposed portions of the wall of the cavity;

(b) metallic extension having a proximal end away from the opposed ends of the pultrusion die and mounted on each of the opposed portions of the wall of the cavity so as to surround the material to be treated and extend away from the wall and having openings at a distal end of each of the housings;

(c) frame means mounted over each of the openings at the distal ends of the extensions, each having a window aligned along and with the longitudinal axis of the die wherein at least one of the frame means is split across the window into two portions which are relatively adjustable to increase or decrease a dimension of the window;

(d) and metallic finger means mounted around the windows of the frame means so as to surround the material to be treated on an outside surface of the cross-section of the material to be processed, wherein in use the microwave leakage at the windows is less than 10 mW/cm$^2$ at a frequency of 2.45 GHz.

2. The apparatus of claim 1 wherein the two portions are provided with aligning pins between the portions so as to maintain the portions in a single plane.

3. The apparatus of claim 2 wherein the frame portions each have slots defining a dimension of adjustment of the frame members and windows and wherein bolts are secured to the extensions through the slots so as to allow restricted movement of the portions in the single plane.

4. The apparatus of claim 1 wherein the pultrusion die is split along the longitudinal axis.

5. The apparatus of claim 1 wherein the pultrusion die has a decreasing tapered portion at an inlet into the pultrusion die so that the material to be processed is compressed by the pultrusion die.

6. The apparatus of claim 1 wherein the die is ceramic.

7. The apparatus of claim 1 wherein the longitudinal axis of the die is parallel to a surface of the plate means and perpendicular to the central axis of the cavity, such that the material to be treated moves parallel to the plate means in the die.

8. The apparatus of claim 7 wherein the probe means is positioned through the wall of the cavity between the plate means and the die.

9. The apparatus of claim 8 wherein at least one of the frame means is split across the window into two portions which are relatively adjustable to increase or decrease a dimension of the window.

10. The apparatus of claim 9 wherein the two portions are provided with aligning pins between the portions so as to maintain the portions in a single plane.

11. The apparatus of claim 10 wherein the frame portions each have slots defining a dimension of adjustment of the frame members and windows and wherein bolts are secured to the housings through the slots so as to allow restricted movement of the portions in the single plane.

12. A method for pultrusion of a continuous material which comprises:

(a) providing a microwave generating apparatus including a cavity defined by at least one wall which cavity is excited in one or more of its modes of resonance of the microwave in the cavity around a central axis of the cavity including moveable plate means in the cavity mounted perpendicular to the central axis in the cavity and moveable along the central axis, moveable probe means connected to and extending inside the cavity for coupling the microwave to the cavity and control means for moving the probe means and plate means in order to select and control the mode of the electromagnetic wave in the cavity which comprises a lossless pultrusion die with an opening along a longitudinal axis of the die and with a defined cross-section for a material to be treated with the microwaves mounted through the cavity with opposed ends which extend through opposed portions of the wall of the cavity; metallic extensions mounted on each of the opposed portions of the wall of the cavity so as to surround the material to be treated and extend away from the wall and having openings at a distal end of each of the housings; frame means mounted over each of the openings at the distal ends of the extensions, each having a window aligned along and with the longitudinal axis of the die wherein at least one of the frame means is split across the window into two portions which are relatively adjustable to increase or decrease a dimension of the window; and metallic finger means mounted around the windows of the frame means so as to surround the material to be treated on an outside surface of the cross-section of the material to be processed;

(b) providing the frame members so that the material is in contact with the finger means on the frame means to prevent leakage of the microwaves from the cavity;

(c) feeding the material through the die so that the material is cured by the microwaves, wherein the finger means prevent the microwaves from leaking from the cavity and extensions, wherein the microwave leakage at the windows is less than 10 mW/cm$^2$ at a frequency of 2.45 GHz.

13. The method of claim 12 wherein the material being processed is a glass fiber and vinyl resin prepreg.

14. The method of claim 13 wherein the frame means is divided into two portions which are adjusted in step (a) in a plane perpendicular to the longitudinal axis so that the finger means engages the material.

15. The method of claim 12 wherein the probe and plate means are adjusted as the material is processed.

* * * * *